United States Patent [19]

Paurat et al.

[11] Patent Number: 5,180,251
[45] Date of Patent: Jan. 19, 1993

[54] UNDERGROUND PROTECTION UNDERNEATH A DUMP

[76] Inventors: Friedrich W. Paurat, Kasselweg 29, D-4230 Wesel 1; Roland Paurat, Blumenstrasse 11, D-4230 Wesel 13 both of Fed. Rep. of Germany

[21] Appl. No.: 714,250

[22] Filed: Jun. 11, 1991

[30] Foreign Application Priority Data

Jun. 12, 1990 [DE] Fed. Rep. of Germany ....... 4018822
Jun. 12, 1990 [DE] Fed. Rep. of Germany ....... 4018824

[51] Int. Cl.⁵ .............................................. B09B 1/00
[52] U.S. Cl. ...................................... 405/129; 405/55
[58] Field of Search ..................... 405/36, 38, 43, 53, 405/55, 128, 129, 266-270

[56] References Cited

U.S. PATENT DOCUMENTS

| | | | |
|---|---|---|---|
| 4,439,062 | 3/1984 | Kingsbury | 405/129 |
| 4,634,187 | 1/1987 | Huff et al. | 405/53 X |
| 4,753,551 | 6/1988 | Bruggemann et al. | 405/128 |
| 4,846,604 | 7/1989 | Holtmann | 405/128 |
| 4,904,112 | 2/1990 | McDonald | 405/43 X |
| 4,973,196 | 11/1990 | Fuhr et al. | 405/129 |
| 5,043,076 | 8/1991 | Alexander | 405/128 X |
| 5,078,543 | 1/1992 | Terrel | 405/128 |
| 5,080,528 | 1/1992 | Ressi Di Cervio | 405/38 |

FOREIGN PATENT DOCUMENTS

| | | | |
|---|---|---|---|
| 235353 | 9/1987 | European Pat. Off. | 405/129 |
| 3409591 | 9/1985 | Fed. Rep. of Germany | 405/128 |
| 3617956 | 12/1987 | Fed. Rep. of Germany | |
| 7107 | 12/1986 | PCT Int'l Appl. | |

Primary Examiner—Randolph A. Reese
Assistant Examiner—John A. Ricci
Attorney, Agent, or Firm—Herbert Dubno; Andrew M. Wilford

[57] ABSTRACT

A dump sitting on the ground is isolated by first driving a tunnel longitudinally through the ground underneath the dump, then cutting from at least one side of the tunnel with a longwall-mining machine a longitudinally and transversely extending slit having a lower end opening into the tunnel and an upper end opening at ground level, and providing a liquid barrier in the slit underneath the dump. The material dug by the machine to form the slit is first conveyed downward along the slit into the tunnel and thence along and out of the tunnel. Stowing material is brought into the slit from the upper end thereof to backfill behind the machine. The cutting machine itself can be a standard cutter head with a longwall conveyor and a set of following props that hold up the roof behind the cutter until this area is backfilled.

15 Claims, 7 Drawing Sheets

FIG.8

UNDERGROUND PROTECTION UNDERNEATH A DUMP

FIELD OF THE INVENTION

The present invention relates to the protection of the ground water underneath a dump. More particularly this invention concerns a method of and apparatus for isolating a ground-level dump to protect the underlying water table.

BACKGROUND OF THE INVENTION

In order to prevent toxic materials in a ground-level or above-ground dump from leaching into the water table underneath the dump, it is known to install under the dump a leach field from which liquids can be drawn, to prevent them from working themselves deeper into the water table. Such a system does not provide a high degree of protection, as liquid can leak past the leach-field pipes. Furthermore such pipes must normally be installed before the dump is made, that is they cannot be installed readily under an existing dump.

It is also known, for example from German patent document 3,617,956 filed May 28, 1986 by Hans Richter to isolate an existing dump by driving under it a succession of tunnels. As each tunnel is driven, a liquid-stopping membrane and/or drainage pipes are installed. The area behind the driving machine is filled with stowing material derived from the face cutter of the machine to prevent caveins, and any excess such material, which may be stone, earth, or clay depending on the ground composition, is conveyed to the surface. Such a procedure is extremely complex an expensive.

In another known system two slit tunnels are driven directly under the dump by longwall-mining techniques. This forms a basically horizontal barrier directly underneath the dump that can be provided with a vapor barrier and/or a drainage system. Horizontally lateral leaching of pollutants in the dump can still take place, unless expensive vertical slit shafts are subsequently cut to join with the outer edges of the horizontal slit and thereby fully isolate the dump.

OBJECTS OF THE INVENTION

It is therefore an object of the present invention to provide an improved method of and apparatus for isolating a surface dump.

Another object is the provision of such an improved method of and apparatus for isolating a surface dump which over come the above-given disadvantages, that is which is relatively simple yet which provides a high degree of protection and isolation underneath the dump.

SUMMARY OF THE INVENTION

A method of isolating a dump sitting on the ground according to this invention entails first driving a tunnel longitudinally through the ground underneath the dump, then cutting from at least one side of the tunnel with a longwall-mining machine a longitudinally and transversely extending slit having a lower end opening into the tunnel and an upper end opening at ground level, and providing a liquid barrier in the slit underneath the dump. According to the invention the material dug by the machine to form the slit is first conveyed downward along the slit into the tunnel and thence along and out of the tunnel. Stowing material is brought into the slit from the upper end thereof to backfill behind the machine.

This procedure is fairly simple, and allows the dump to be effectively isolated from underneath. A standard longwall-mining machine of the type used to recover a seam of coal can be used to cut the slit. The cutting machine itself can be a standard cutter head with a longwall conveyor and a set of following props that hold up the roof behind the cutter until this area is backfilled. Since at all times there remains a path open to the surface, the various hydraulic and electric power lines can be serviced from surface supplies, further simplifying the system. The spoil is carried off via the tunnel which can be tipped slightly to facilitate collecting any water running into it from the cut.

In accordance with this invention the tunnel has end tunnel portions that extend at an acute angle to the horizontal and open at the surface and is formed between the end portions with a generally horizontal middle portion. These end portions can be vertical shafts, but normally are simply inclined portions. Furthermore one such slit is cut from each side of the tunnel, although in some situations a single such slit might serve to adequately isolate the dump. Two slits form an encapsulation that has the shape of a boat hull, allowing the bulk of the work to be done with standard longwall-mining equipment.

According to further features of the invention the machine is advanced transversely of the tunnel. In addition the roof of the slit is propped up by standard mine props while the face is cut. Furthermore the method can comprise the step of cutting grooves into a roof of the slit and then fitting drainage pipes into these grooves before backfilling the cut. Furthermore the liquid barrier according to this invention is a liquid-stopping sheet installed in the cut behind the cutting machine before backfilling the slit. When a helical-tooth cutter is used holes are bored underneath the dump from the tunnel and draft elements are connected through the holes with the machine to pull same transversely as it cuts the slit.

The apparatus according to this invention has props immediately behind the cutter for supporting a roof of the slit. These props include back props and front props between the back props and the cutter. The cutter, back props, and front props are articulated together about longitudinal axes and are provided with actuators for stepping themselves transversely and relative to each other. Each prop includes an upper roof-engaging part, a lower floor-engaging part, and a vertically extensible actuator braced vertically between the respective parts. The roof parts of the front and back props have interengaging comblike back and front edges. Furthermore the means for providing the liquid barrier includes a supply of a liquid-stopping sheet and means for installing it transversely behind the cutter and above the backfill. It is also within the scope of this invention to employ props that are left in the cut, the backfill filling around them.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
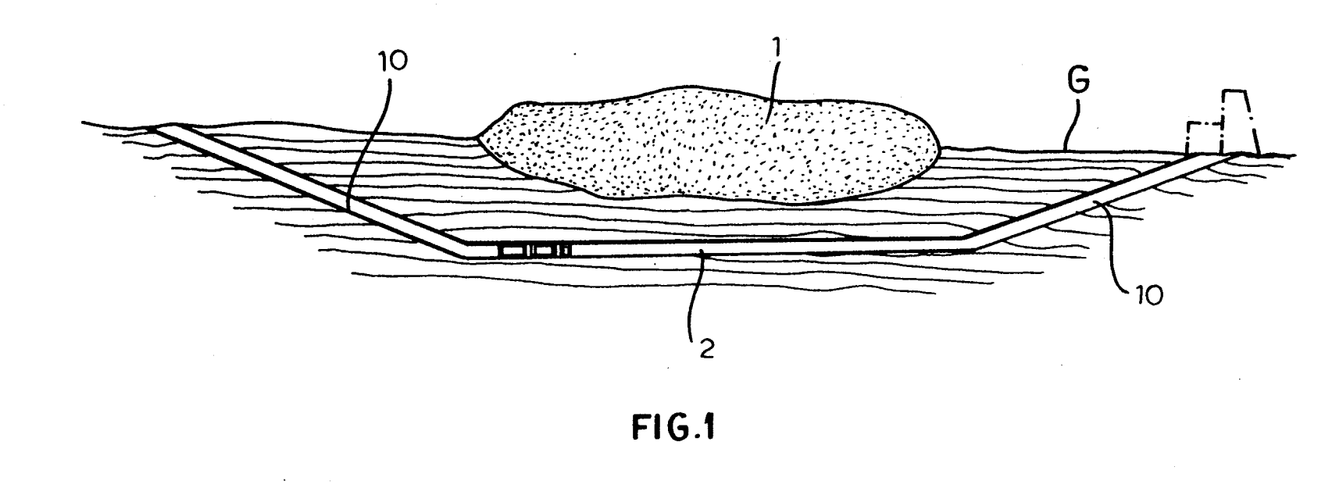
FIG. 1 is a very small-scale longitudinal section through a dump according to the invention.
Figure 2:
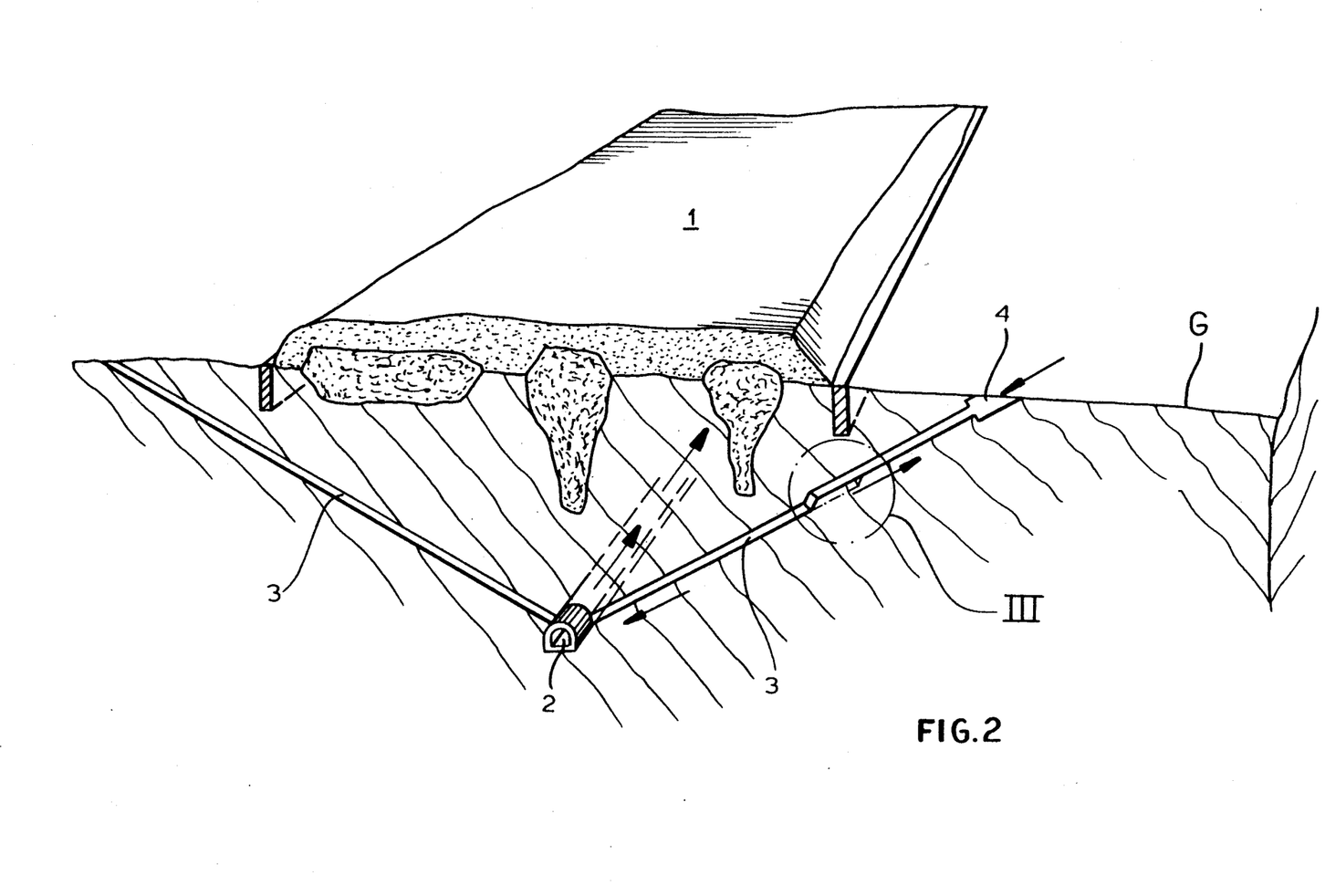
FIG. 2 is a larger scale cross section through the dump.

As seen in FIGS. 1 and 2 a dump 1 here lying mainly above the surface G of the ground is isolated according to this invention by first driving a tunnel 2 longitudinally underneath it. The tunnel 2 has a middle portion that extends horizontally and two end portions 10 that open at the surface G and that may run at an incline as shown or vertically as shafts. Extending upward from each side of the tunnel according to the invention is a slit 3 whose lower end opens into the tunnel 2 and whose upper end 4 opens at the surface G. These slits 3 are cut right from the surface so that they form with the tunnel 2 a boat-shaped cut underneath the dump 1.

Figure 3:
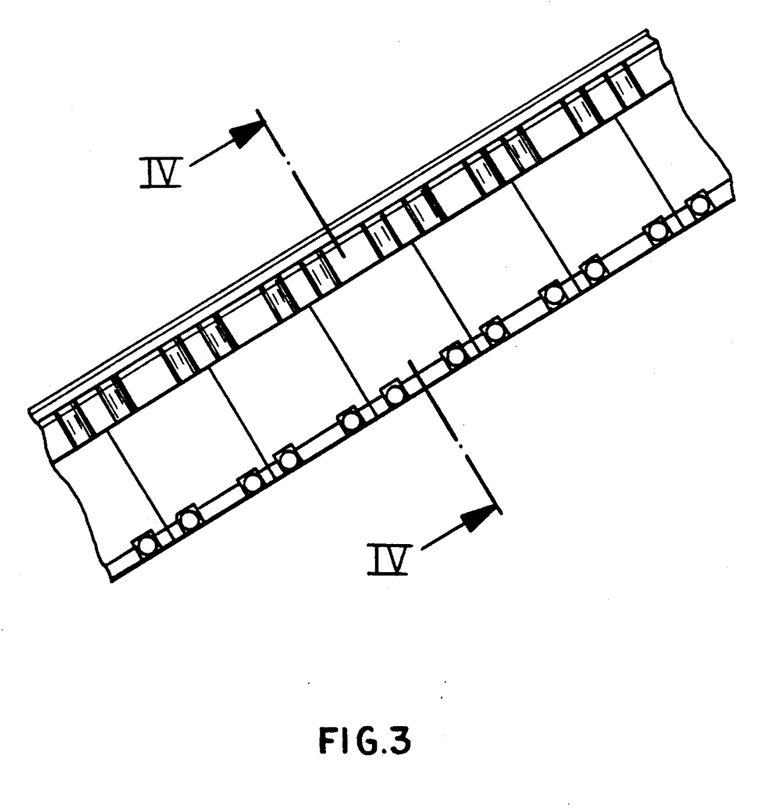
FIG. 3 is a larger view of the detail indicated at III in FIG. 2.
Figure 4:
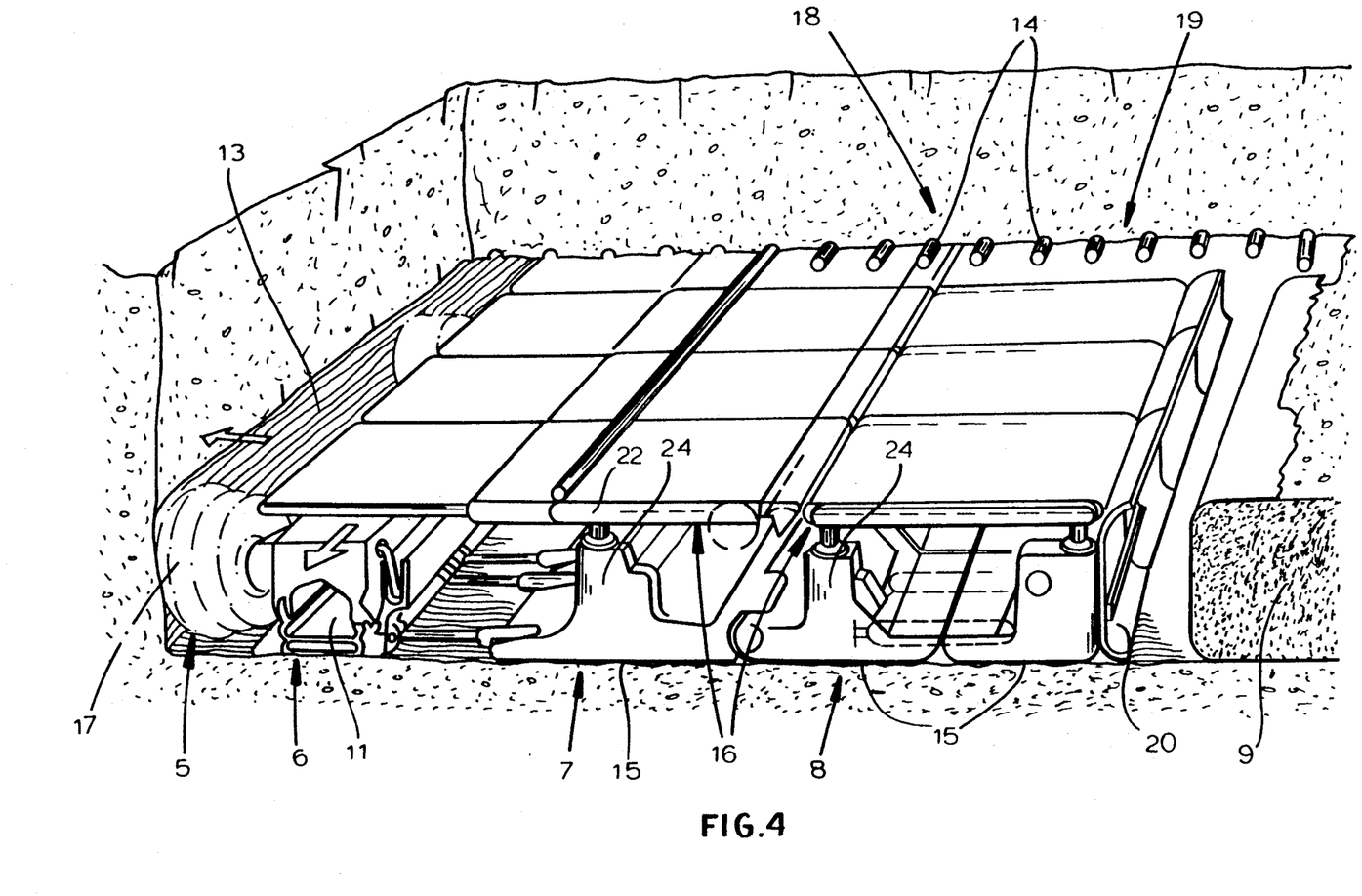
FIG. 4 is a section taken along line IV—IV of FIG. 3.
Figures 5, 5A:
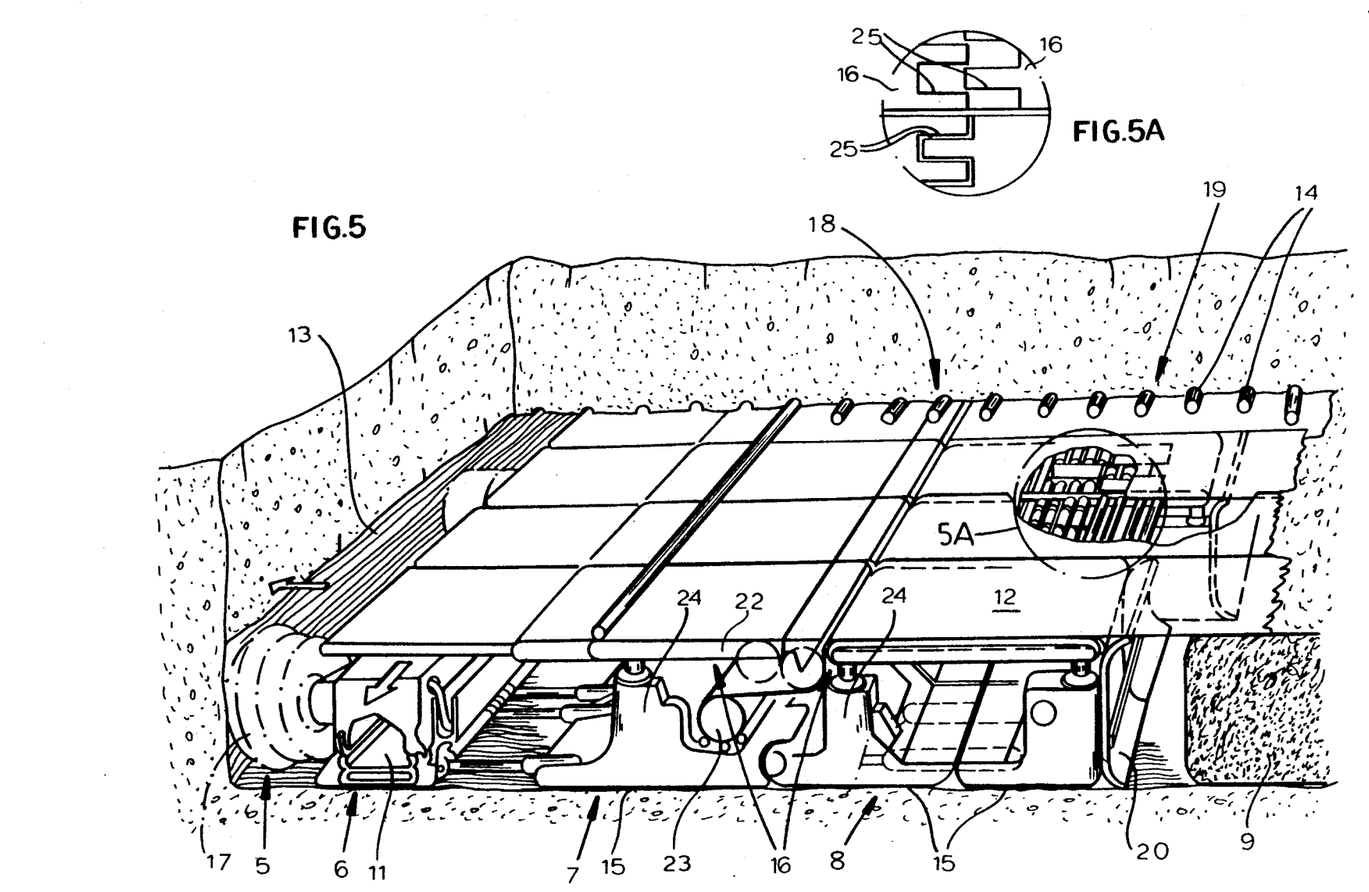
FIG. 5 is a view like FIG. 4 of an alternative arrangement in accordance with this invention.
FIG. 5A is a large-scale top view of a detail of FIG. 5.

As seen in FIGS. 3 and 4 the slits 3 are made by a longwall mining machine comprising a face cutter 5 having rotary heads 17, a conveyor 6, a roof-prop system 7, and a device 8 for conveying stowing material 9 into the cut 3 behind the machine. The conveyor 6 displaces rock and other material cut from the transverse face down to the tunnel 2 whence it is moved by another standard conveyor up to one of its ends. This material and/or other material is then fed back down from the slit end 4 to the device 8 for stowing behind the machine to prevent cave-ins.

As better shown in FIGS. 3 and 4 the conveyor 6 has a trough 11 whose outlet end empties onto another such conveyor in the tunnel 2. A spool 23 of a vapor-barrier foil 12, a thick synthetic-resin sheet, is held on the machine and is unwound behind it as it advances longitudinally parallel to the tunnel 2. In addition the machine cuts grooves 13 in the ceiling of the cuts 3 and lays perforated drainage pipes 14 in these grooves. These pipes 14 therefore lie atop the liquid-barrier film 12 to allow any leachate to be drawn off, thereby protecting the underlying water table. The stowing material 9 is typically also mixed with a waterproofing material, for instance clay and/or portland cement, so that it forms yet another liquid barrier.

Figure 6:
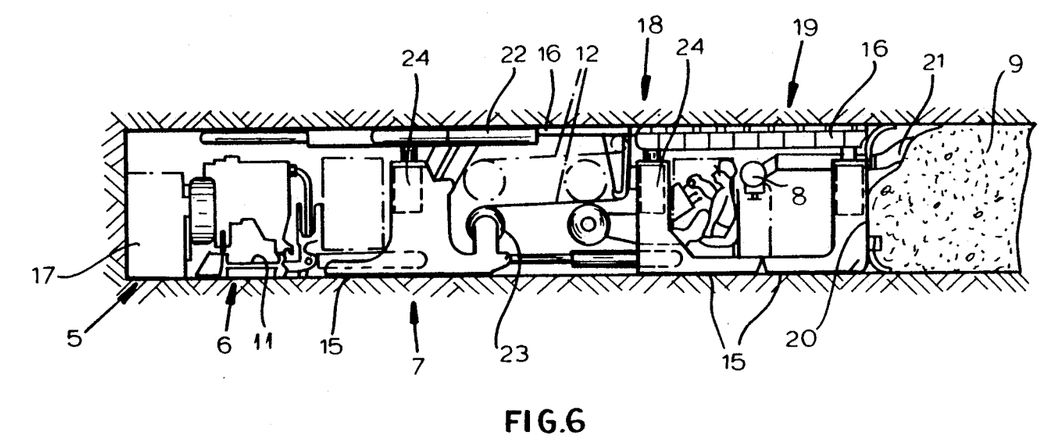
FIGS. 6 and 7 are small-scale views indicating the system of FIG. 5 in two different operational positions.
Figure 7:
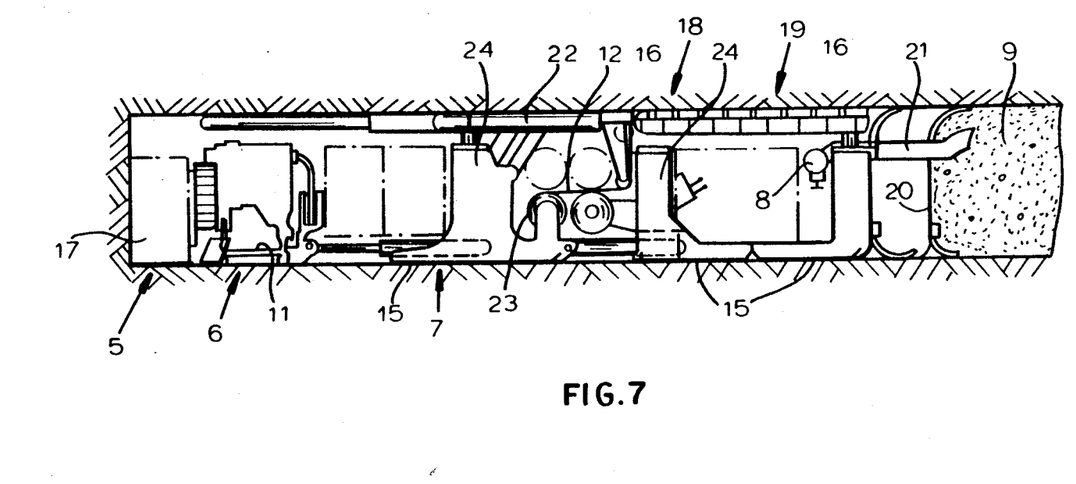

The prop 7 includes a front prop 18 and a rear prop 19, each comprising a floor-engaging element 15, a ceiling engaging element 16, and hydraulic rams 24 that press the ceiling element 16 up and floor elements 15 down, thereby preventing caveins behind the cutter 5. Transversely extending rams 22 between the front and rear props 18 and 19 allow them to be stepped along behind the advancing machine as can be seen by a comparison of FIGS. 6 and 7. The two roof elements 16 are comb-shaped and interfit as shown at 25 in FIG. 5A. The rear prop 19 carries a vertical shield 20 behind which the stowing material 9 is packed. This stowing material 9 is fed to the back of the cut via a pipe 21 from the rear conveyor 8. The props 18 and 19 are articulated together about axes running parallel to the tunnel 2 so they can follow any irregularities in the cut.

Figure 8:
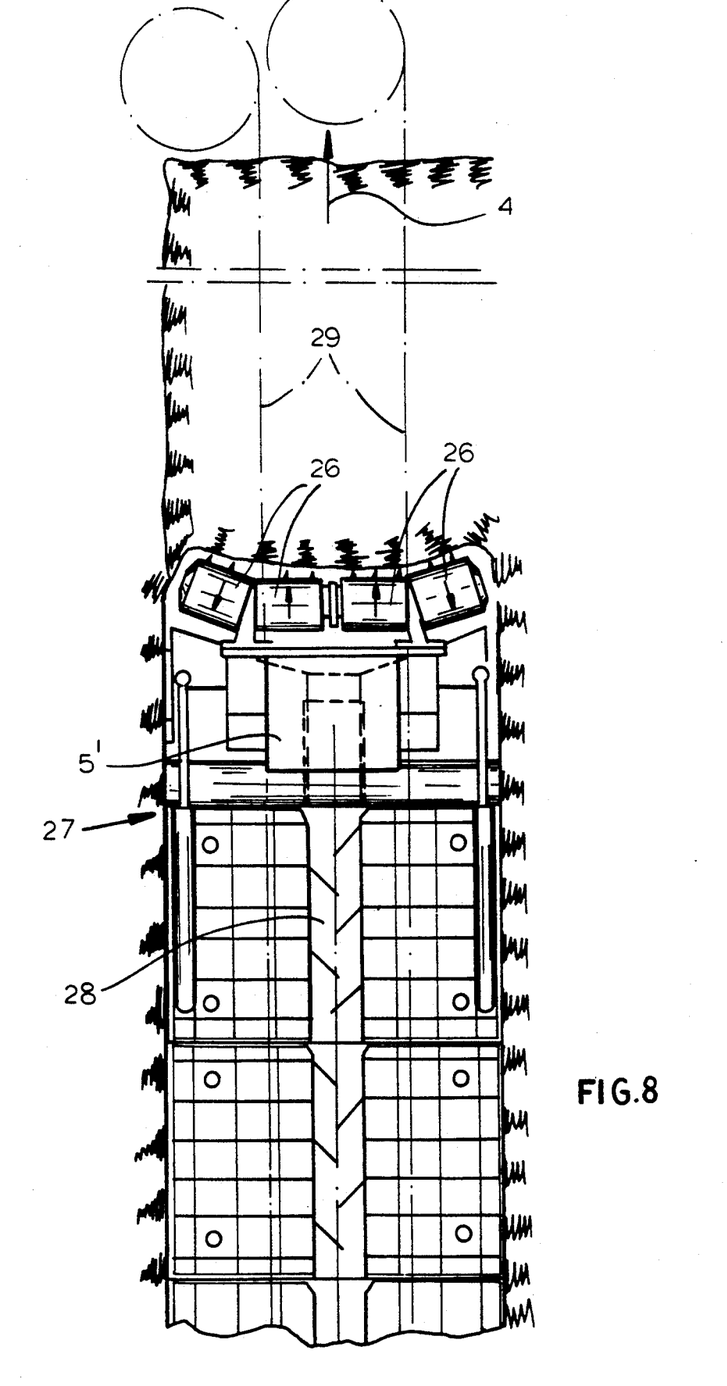
FIG. 8 is a small-scale top view of another system according to the invention.

FIG. 8 shows another arrangement wherein the machine 5' has a helix cutter 26 followed by a prop 27 and a conveyor 28. Cables 29 or the like pass through previously drilled holes to pull the machine along. Once again the stowing material is fed from the back end of the slit to the rear of the face.

We claim:

1. A method of isolating a dump sitting on the ground, the method comprising the steps of:
   driving a tunnel longitudinally through the ground underneath the dump;
   cutting from at least one side of the tunnel with a longwall-mining machine a longitudinally and transversely extending slit having a lower end opening into the tunnel and an upper end opening at ground level;
   providing a liquid barrier in the slit underneath the dump;
   conveying the material dug by the machine to form the slit downward along the slit into the tunnel and thence along and out of the tunnel; and
   bringing stowing material into the slit from the upper end thereof and backfilling behind the machine with the stowing material.

2. The dump-isolation method defined in claim 1 wherein the tunnel has end tunnel portions that extend at an acute angle to the horizontal and open at the surface and is formed between the end portions with a generally horizontal middle portion.

3. The dump-isolation method defined in claim 1 wherein one such slit is cut from each side of the tunnel.

4. The dump-isolation method defined in claim 1 wherein the machine is advanced transversely of the tunnel.

5. The dump-isolation method defined in claim 1, further comprising the step of
   propping up a roof of the slit while cutting same.

6. The dump-isolation method defined in claim 1 wherein the liquid barrier is provided by
   installing drainage pipes into a roof of the cut before backfilling same.

7. The dump-isolation method defined in claim 1 wherein the liquid barrier is provided by
   installing a liquid-stopping sheet in the cut behind the cutting machine before backfilling the slit.

8. The dump-isolation method defined in claim 1, further comprising the steps of
   boring holes transversely of and opening into the tunnel; and
   connecting draft elements through the holes with the machine to pull same transversely as it cuts the slit.

9. An apparatus for isolating a dump sitting on the ground, the apparatus comprising:
   means for driving a tunnel longitudinally through the ground underneath the dump;
   means for cutting from at least one side of the tunnel with a longwall-mining machine a longitudinally and transversely extending slit having a lower end opening into the tunnel and an upper end opening at ground level;
   means for providing a liquid barrier in the slit underneath the dump;
   means for conveying the material dug by the machine to form the slit downward along the slit into the tunnel and thence along and out of the tunnel; and means for bringing stowing material into the slit from the upper end thereof and backfilling behind the machine with the stowing material.

10. The dump-isolating apparatus defined in claim 9, further comprising props immediately behind the cutting means for supporting a roof of the slit.

11. The dump-isolating apparatus defined in claim 10 wherein the props include back props and front props between the back props and the cutting means, the cutting means, back props, and front props being articulated together about longitudinal axes and being provided with means for stepping themselves transversely and relative to each other.

12. The dump-isolating apparatus defined in claim 11 wherein each prop includes an upper roof-engaging part, a lower floor-engaging part, and a vertically extensible actuator braced vertically between the respective parts.

13. The dump-isolating apparatus defined in claim 11 wherein the roof parts of the front and back props have interengaging comblike back and front edges.

14. The dump-isolating apparatus defined in claim 9 wherein the means for providing the liquid barrier includes a supply of a liquid-stopping sheet and means for installing it transversely behind the cutting means and above the backfill.

15. A method of isolating a dump sitting on the ground, the method comprising the steps of:

driving a tunnel longitudinally through the ground underneath the dump;

cutting from at least one side of the tunnel with a longwall-mining machine a longitudinally and transversely extending slit having a lower end opening into the tunnel and an upper end opening at ground level;

forming longitudinal grooves in the roof of the slit while cutting same;

providing a liquid barrier in the slit underneath the dump by installing perforated drainage pipes in the grooves;

conveying the material dug by the machine to form the slit downward along the slit into the tunnel and thence along and out of the tunnel; and bringing stowing material into the slit from the upper end thereof and backfilling behind the machine with the stowing material.

* * * * *